United States Patent
Inokawa

(10) Patent No.: US 9,085,694 B2
(45) Date of Patent: Jul. 21, 2015

(54) PHENOLIC RESIN MOLDING COMPOUND

(75) Inventor: Daisuke Inokawa, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 13/603,831

(22) Filed: Sep. 5, 2012

(65) Prior Publication Data

US 2013/0059974 A1 Mar. 7, 2013

(30) Foreign Application Priority Data

Sep. 6, 2011 (JP) ................................ 2011-193712

(51) Int. Cl.
- *C04B 26/12* (2006.01)
- *C08L 71/12* (2006.01)
- *C08K 13/04* (2006.01)
- *C08K 3/04* (2006.01)
- *C08K 5/3477* (2006.01)
- *C08K 7/02* (2006.01)
- *C08L 61/06* (2006.01)
- *F16D 69/02* (2006.01)

(52) U.S. Cl.
CPC ................. *C08L 71/126* (2013.01); *C08K 3/04* (2013.01); *C08K 5/3477* (2013.01); *C08K 7/02* (2013.01); *C08K 13/04* (2013.01); *C08L 61/06* (2013.01); *F16D 69/026* (2013.01); *F16D 2200/0065* (2013.01)

(58) Field of Classification Search
CPC .......... C08K 3/0033; C08K 3/04; C08K 3/40; C08K 5/0025; C08K 5/16; C08K 5/17; C08K 5/34; C08K 5/3467; C08K 7/02; C08K 7/14; C08L 61/34; C08L 61/06; C08L 61/16
USPC .................................. 524/594, 700
See application file for complete search history.

(56) References Cited

U.S. PATENT DOCUMENTS

| | | | | |
|---|---|---|---|---|
| 3,857,811 A * | 12/1974 | Grazen et al. | ................. | 523/157 |
| 3,960,982 A * | 6/1976 | Numata et al. | ................. | 525/500 |
| 4,020,035 A * | 4/1977 | Edwards et al. | ............... | 524/449 |
| 4,624,984 A * | 11/1986 | Korb et al. | ..................... | 524/541 |
| 4,845,162 A * | 7/1989 | Schmitt et al. | ................. | 525/423 |
| 4,918,116 A * | 4/1990 | Gardziella et al. | ............. | 523/149 |
| 5,162,428 A * | 11/1992 | Katoh et al. | ................... | 524/594 |
| 5,336,723 A * | 8/1994 | Ikeda et al. | ................... | 525/139 |
| 5,424,353 A * | 6/1995 | Ferrier et al. | ................. | 524/496 |
| 5,432,227 A * | 7/1995 | Fujimura | ....................... | 524/508 |
| 5,721,332 A * | 2/1998 | Kano et al. | ..................... | 528/129 |
| 5,952,447 A * | 9/1999 | Ikeda | ............................. | 528/163 |
| 6,133,403 A * | 10/2000 | Gerber | ........................... | 528/218 |
| 6,147,153 A * | 11/2000 | Kudoh | ........................... | 524/494 |

FOREIGN PATENT DOCUMENTS

| | | | | |
|---|---|---|---|---|
| JP | 02169653 A | * | 6/1990 | ............. C08L 61/06 |
| JP | 2005-47971 A | | 2/2005 | |
| JP | 2005-265033 A | | 9/2005 | |
| JP | 2011-68705 A | | 4/2011 | |
| RU | 2 285 018 C1 | | 10/2006 | |

OTHER PUBLICATIONS

JP 02169653 A, published Jun. 29, 1990, English language abstract.*
Extended European Search Report dated Nov. 6, 2012, issued in European Patent Application No. 12006281.5 (6 pages).

* cited by examiner

*Primary Examiner* — Jane L Stanley

(74) *Attorney, Agent, or Firm* — Westerman, Hattori, Daniels & Adrian, LLP

(57) ABSTRACT

Provided is a phenolic resin molding compound including (A) a novolac-type phenolic resin including an alkylbenzene-modified novolac-type phenolic resin, (B) a resol-type phenolic resin, (C) hexamethylenetetramine, (D) graphite, and (E) fiber-shaped filler, wherein in regard to the content of each component on the basis of the entirety of the molding compound, a total content of the components (A) to (C) is 30 to 40% by weight, a content of the component (D) is 30 to 50% by weight, and a content of the component (E) is 5 to 20% by weight.

4 Claims, No Drawings

PHENOLIC RESIN MOLDING COMPOUND

This application is based on Japanese patent application No. 2011-193712, the content of which is incorporated hereinto by reference.

BACKGROUND

1. Technical Field

The invention relates to a phenolic resin molding compound.

2. Related Art

Hitherto, there has been a demand for heat resistance and abrasion resistance in mechanical parts that are used in vehicles and the like. As a material that satisfies these characteristics, parts formed from ceramic or metal have been used in mechanical parts in the related art. However, the mechanical parts formed from ceramic or metal have various problems in that the weight thereof is heavy, it takes a long time for processing, the cost is high, and the like. As means for solving these problems, mechanical parts formed from plastic material have attracted attention from a viewpoint of weight reduction of the parts.

As a material that is used in the case of forming the mechanical parts, among plastic materials, particularly, a phenolic resin molding compound has attracted attention from a viewpoint of heat resistance or abrasion resistance. The mechanical parts that include the phenolic resin molding compound are superior in that the weight thereof is lighter, processing is easier, and heat resistance is higher compared to mechanical parts formed from ceramic or metal. In addition, to give heat resistance and mechanical strength to the mechanical parts, glass fiber, silica, or the like has been used as a filling material in the related art. However, in the case of forming the mechanical parts using the phenolic resin molding compound, when the filling material such as the glass fiber and silica is used, the mechanical strength is improved, but there is a problem in that the abrasion resistance deteriorates. Therefore, in a case where the abrasion resistance is an important characteristic, the phenolic resin molding compound that is inferior in abrasion resistance may not be used. In addition, in a case where the mechanical parts are molded using the phenolic resin molding compound, since dimensional change may easily occur, there is a problem in that the dimensions of the mechanical parts are not maintained within a tolerance, and a yield ratio deteriorates.

A precision part may absorb moisture and swell, such that operation failure may be caused. Therefore, it is necessary to make dimensional stability under high humidity excellent.

As technologies of improving an abrasion characteristic and water resistance of a mechanism part that is molded using a phenolic resin molding compound, technologies described in Japanese Unexamined patent publication NOs. 2005-47971, 2005-265033, and 2011-68705 have been disclosed.

Japanese Unexamined patent publication NO. 2005-47971 discloses a technology of improving an abrasion characteristic by blending graphite that is a solid lubricant to a phenolic resin molding compound.

Japanese Unexamined patent publication NO. 2005-265033 discloses a technology of improving an abrasion characteristic and a mechanical characteristic by using glass fiber in combination in addition to graphite. In the technology disclosed in Japanese Unexamined patent publication NO. 2005-265033, in regard to contents of the graphite and glass fiber on the basis of the entirety of the molding compound, the content of the graphite is 5 to 20% by weight and the content of the glass fiber is 40 to 60% by weight.

Japanese Unexamined patent publication NO. 2011-68705 discloses a technology of improving dimensional accuracy and dimensional stability with heat resistance and moisture resistance by blending an alkylbenzene-modified novolac-type phenolic resin and glass fiber. In the technology disclosed in Japanese Unexamined patent publication NO. 2011-68705, on the basis of the entirety of the molding compound, a total content of (A) a novolac-type phenolic resin including the alkylbenzene-modified novolac-type phenolic resin, (B) a resol-type phenolic resin, and (C) hexamethylenetetramine is 15 to 30% by weight, and a content of the glass fiber is 10 to 20% by weight.

SUMMARY

However, in the technology disclosed in Japanese Unexamined patent publication NO. 2005-47971, in a case where the graphite is merely used as the filling material, since the mechanical strength becomes low, a molded article is brittle, and thus cracking may easily occur. In addition, the technology disclosed in Japanese Unexamined patent publication NO. 2005-265033 may not be sufficient from a viewpoint of water resistance. In addition, the technology disclosed in Japanese Unexamined patent publication NO. 2011-68705 may not be sufficient from a viewpoint of abrasion resistance.

An object of the invention is to provide a phenolic resin molding compound in which an abrasion characteristic and mechanical strength are balanced to a high degree, and which is excellent in water resistance.

The present inventors have extensively studied with respect to kinds of components contained and blending amounts thereof so as to provide a phenolic resin molding compound that has an excellent abrasion characteristic, mechanical strength, and water resistance with a good balance. As a result thereof, the present inventors have found that when five components of (A) a novolac-type phenolic resin including an alkylbenzene-modified novolac-type phenolic resin, (B) a resol-type phenolic resin, (C) hexamethylenetetramine, (D) graphite, and (E) a fiber-shaped filler are blended in a specific blending amount, respectively, it is effective as a design guideline, and the invention is accomplished.

In an embodiment, there is provided a phenolic resin molding compound including (A) a novolac-type phenolic resin including an alkylbenzene-modified novolac-type phenolic resin, (B) a resol-type phenolic resin, (C) hexamethylenetetramine, (D) graphite, and (E) a fiber-shaped filler, wherein in regard to the content of each component on the basis of the entirety of the molding compound, a total content of the components (A) to (C) is 30 to 40% by weight, a content of the component (D) is 30 to 50% by weight, and a content of the component (E) is 5 to 20% by weight.

According to the invention, it is possible to provide a phenolic resin molding compound which an abrasion characteristic and mechanical strength are balanced to a high degree, and which is excellent in water resistance. Therefore, the phenolic resin molding compound relating to the invention may be appropriately used as a gas meter part (a distribution chamber or a valve), or a sliding part such as a vane pump part of a vehicle.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, a phenolic resin molding compound (hereinafter, may be simply referred to as "molding compound") of the invention will be described in detail.

First, in a case where the phenolic resin molding compound is molded to be used as a gas meter part (a distribution chamber or a valve), or a sliding part such as a vane pump part of a vehicle, it is necessary for the phenolic resin molding compound to exhibit properties such as low friction with a counter material, that is, a high sliding property (i), high mechanical strength allowing a use for a vehicle (ii), and no dimensional change even in a high-humidity conditions or in a state of being dipped in water, that is, high water resistance (iii), respectively.

A molding compound relating to this embodiment is a phenolic resin molding compound including (A) a novolac-type phenolic resin including an alkylbenzene-modified novolac-type phenolic resin, (B) a resol-type phenolic resin, (C) hexamethylenetetramine, (D) graphite, and (E) a fiber-shaped filler, wherein in regard to contents of respective components on the basis of the entirety of the molding compound, a total content of the components (A) to (C) is 30 to 40% by weight, a content of the component (D) is 30 to 50% by weight, and a content of the component (E) is 5 to 20% by weight. In this manner, when the respective components (A) to (E) are blended in a specific ratio, it is possible to obtain a phenolic resin molding compound which an abrasion characteristic and mechanical strength may be balanced to a high degree, and which is excellent in water resistance.

Hereinafter, respective components that are blended into the phenolic resin molding compound relating to this embodiment and blending amounts thereof will be described.

First, (A) the novolac-type phenolic resin including an alkylbenzene-modified novolac-type phenolic resin is blended into the molding compound relating to this embodiment.

Here, the alkylbenzene-modified novolac-type phenolic resin represents a resin which an alkylbenzene such as xylene and toluene is bonded to a novolac-type phenolic resin with methylene bonding or the like. When this alkylbenzene-modified novolac-type phenolic resin is blended into the molding compound, water resistance and heat resistance may be increased while maintaining the mechanical strength at a practical-use level compared to a case in which a common novolac-type phenolic resin is blended into the molding compound. The reason is because a hydrophilic hydroxyl group of a phenolic resin is substituted a hydrophobic alkylbenzene, and thus a water absorption rate of the molding compound may be reduced.

In addition, a method of producing the alkylbenzene-modified novolac-type phenolic resin is not particularly limited, but for example, the following method may be used. First, an alkylbenzene and formaldehyde are made to react with each other in the presence of an acidic catalyst to produce an alkylbenzene resin. Next, the alkylbenzene resin that is obtained is made to react with phenols or phenols and aldehydes in the presence of an acidic catalyst. In this way, the alkylbenzene-modified novolac-type phenolic resin relating to this embodiment may be obtained. In addition, in the alkylbenzene-modified novolac-type phenolic resin relating to this embodiment, a modification ratio of the alkylbenzene is preferably equal to or more than 3% by weight and equal to or less than 70% by weight on the basis of the sum of the phenolic resin and an alkyl-modified novolac resin, and more preferably equal to or more than 5% by weight and equal to or less than 50% by weight. When the modification ratio is set in this way, the water resistance and heat resistance of the molding compound may be further increased, and balance between the abrasion characteristic and the mechanical strength may be maintained to a high degree.

In addition, the phenols that are used at the time of producing the alkylbenzene-modified novolac-type phenolic resin relating to this embodiment are not particularly limited, but examples thereof include phenol, o-cresol, m-cresol, p-cresol, xylenol, alkylphenols, catechol, resorcinol, and the like. In addition, these phenols may be used alone or in combination of two or more.

In addition, aldehydes that are used at the time of producing the alkylbenzene-modified novolac-type phenolic resin relating to this embodiment are not particularly limited, but examples thereof include aldehydes such as formaldehyde, paraformaldehyde, and benzaldehyde, materials that are sources of these aldehydes, solutions of these aldehydes, and the like. In addition, these aldehydes may be used alone or in combination of two or more.

In addition, examples of the alkylbenzene-modified novolac-type phenolic resin relating to this embodiment include xylene-modified novolac-type phenolic resin, toluene-modified novolac-type phenolic resin, and the like.

In addition, in the molding compound relating to this embodiment, a content of the alkylbenzene-modified novolac-type phenolic resin in the component (A) is preferably 20 to 30% by weight on the basis of the sum of the components (A) and (B), and more preferably 15 to 25% by weight. When the content of the alkylbenzene-modified novolac-type phenolic resin is set to be equal to or more than the lower limit, a material in which a water-resistant dimensional change is small may be obtained, and when the content thereof is set to be equal to or less than the upper limit, the mechanical strength may be set to a very appropriate level.

In addition, in the molding compound relating to this embodiment, the component (A) may contain a novolac-type phenolic resin other than the alkylbenzene-modified novolac-type phenolic resin. When the novolac-type phenolic resin is contained in this way, the manufacturing cost may be reduced. Here, in the component (A), a content of the novolac-type phenolic resin other than the alkylbenzene-modified novolac-type phenolic resin is preferably 60 to 80% by weight.

In addition, as the novolac-type phenolic resin that is contained in the component (A), a resin, which is commonly obtained by making phenols and aldehydes react with each other in the presence of an acidic catalyst with a molar ratio (aldehydes/phenols) of aldehydes to phenols being set to 0.7 to 0.9, may be used.

In addition, the phenols that are used at the time of producing the novolac-type phenolic resin other than the alkylbenzene-modified novolac-type phenolic resin are not particularly limited, but examples thereof include phenol, o-cresol, m-cresol, p-cresol, xylenol, alkylphenols, catechol, resorcinol, and the like. In addition, these phenols may be used alone or in combination of two or more.

In addition, aldehydes that are used at the time of producing the novolac-type phenolic resin other than the alkylbenzene-modified novolac-type phenolic resin relating to this embodiment are not particularly limited, but examples thereof include aldehydes such as formaldehyde, paraformaldehyde, and benzaldehyde, materials that are sources of these aldehydes, solutions of these aldehydes, and the like. In addition, these aldehydes may be used alone or in combination of two or more.

Next, (B) the resol-type phenolic resin is blended into the molding compound relating to this embodiment. Due to this, toughness of a molded article that is obtained by molding the molding compound may be improved, and thus the mechanical strength may be increased.

As the resol-type phenolic resin relating to this embodiment, a resin, which is commonly obtained by making phenols and aldehydes react with each other in the presence of a basic catalyst with a molar ratio (aldehydes/phenols) of aldehydes to phenols being set to 1.3 to 1.7 may be used.

The phenols that are used at the time of producing the resol-type phenolic resin relating to this embodiment are not particularly limited, but examples thereof include phenol, o-cresol, m-cresol, p-cresol, xylenol, alkylphenols, catechol, resorcinol, and the like. In addition, these phenols may be used alone or in combination of two or more.

In addition, aldehydes that are used at the time of producing the resol-type phenolic resin relating to this embodiment are not particularly limited, but examples thereof include aldehydes such as formaldehyde, paraformaldehyde, and benzaldehyde, materials that are sources of these aldehydes, solutions of these aldehydes, and the like. In addition, these aldehydes may be used alone or in combination of two or more.

Next, (C) the hexamethylenetetramine is blended into the molding compound relating to this embodiment. The component (C) serves as a curing agent of the component (A) together with the component (B).

In addition, a blending amount of the hexamethylenetetramine on the basis of the entirety of the molding compound is not particularly limited, but for example, 30 to 40 parts by weight is blended in on the basis of 100 parts by weight of the component (A). Furthermore, in the molding compound relating to this embodiment, in addition to the hexamethylenetetramine and the component (B), a component serving as a curing agent of the component (A) may be used in combination. As this curing agent, for example, components such as trimethylamine and pyridine may be exemplified.

To obtain the phenolic resin molding compound relating to this embodiment that is excellent in an abrasion characteristic, mechanical strength, and water resistance, and that is excellent from the viewpoint of balance between these three characteristics, it is preferable that the total contents of the components (A), (B), and (C) be 30 to 40% by weight on the basis of the entirety of the molding compound, and more preferably 33 to 38% by weight. When the total content of these three components is set to be equal to or more than the lower limit, satisfactory workability may be secured during producing the molding compound, and when the total content is set to be equal to or less than the upper limit, a water-resistant dimensional change may be made to be small. The reason is not clear, but it is assumed that since the hydrophobic alkylbenzene is contained in the alkylbenzene-modified novolac-type phenolic resin as described above, the component (B) and the component (C) are further used in combination as a curing agent of the component (A), and thus a decrease in curing property may be suppressed, and the water resistance of the molding compound may be improved. Furthermore, from the viewpoints of balance between the water resistance, the abrasion characteristic, and the mechanical strength, when the total content of the three components is outside the above-described range, a synergistic effect of the components (D) and (E) to be described later may not be exhibited.

Next, (D) the graphite is blended into the molding compound relating to this embodiment. Furthermore, in the molding compound relating to this embodiment, it is preferable that the graphite be blended in an amount of 30 to 50% by weight on the basis of the entirety of the molding compound, and more preferably 35 to 45% by weight. When the blending is carried out in this way, workability becomes very appropriate during producing the molding compound, the abrasion characteristic may be improved, and the balance between the water resistance, the abrasion characteristic, and the mechanical strength may be maintained to a high degree. The reason is considered that the graphite is an excellent solid lubricant, and thus the graphite may decrease, particularly, a friction coefficient. When the graphite is contained within the above-mentioned blending ratio range, it is considered that not only the abrasion characteristic may be improved, but also the balance between the abrasion characteristic, the mechanical strength, and the water resistance may be maintained to a high degree due to a synergistic effect of the components (A), (B), (C), and (E).

Next, (E) the fiber-shaped filler is blended into the molding compound relating to this embodiment. Furthermore, in the molding compound relating to this embodiment, it is preferable that the fiber-shaped filler be blended in an amount of 5 to 20% by weight on the basis of the entirety of the molding compound, and more preferably 10 to 15% by weight. When the blending is carried out in this way, the mechanical strength of a molded article may be improved. Specifically, when the fiber-shaped filler is blended into the molding compound within the content of above-described range, an elastic modulus and a degree of elongation of the molded article reach a very appropriate level, and thus sufficient toughness may be secured, that is, the mechanical strength may be improved. Furthermore, balance between the abrasion characteristic and the mechanical characteristic may be satisfactory.

In addition, examples of the fiber-shaped filler relating to this embodiment include glass fiber, carbon fiber, rock wool, and the like. Among these, it is preferable to use glass fiber. In addition, although it is not being particularly limited to, as the glass fiber, it is preferable to use glass fiber having a number-average fiber diameter of 10 to 15 µm, and a number-average fiber length of 1 to 3 mm, and it is more preferable to use glass fiber having a number-average fiber diameter of 11 to 13 µm, and a number-average fiber length of 2 to 3 mm. In this manner, workability during producing the molding compound and the mechanical strength of a molded product that is obtained may be further improved.

In addition, in the molding compound relating to this embodiment, various additives that are used in a common thermosetting resin molding compound, for example, a curing catalyst, a mold releasing agent such as stearic acid or polyethylene, an adhesiveness improving agent or a coupling agent that improves adhesiveness between a filling agent and the thermosetting resin, a solvent, and the like may be blended in according to necessity.

In addition, in this embodiment, a rectangular parallelepiped test specimen of 8×4×2 mm, which is obtained by injection-molding a granular molding compound (a mold temperature is set to 180° C. and a curing time is set to 15 seconds), is annealed at 160° C. for six hours and then is dipped in warm water at 80° C. for 72 hours, and a ratio of a dimension in a 8 mm direction after being dipped with respect to a dimension in the 8 mm direction before being dipped is set as a dimensional change ratio that is an index indicating water resistance of the molding compound. In addition, a unit is %. In this embodiment, the dimensional change ratio of the molding compound in this embodiment is preferably 0.32% or less, and more preferably 0.25% or less. When the dimensional change ratio is within the above-described range, a molded article in a state in which all of the water resistance, the mechanical strength, and the abrasion characteristic are excellent, and these three characteristics are balanced may be obtained.

In addition, a method of producing the molding compound relating to this embodiment is not particularly limited as long as the method is used in the related art, but for example, a method in which in addition to the raw materials, a filling agent, a curing agent, a curing catalyst, a mold releasing agent, a coupling agent, and the like are blended in are uniformly mixed according to necessity, and then the resultant mixture is heated, melted, and kneaded by using a kneader alone such as a roll, a co-kneader, and a biaxial extruder or by using the roll and another mixing device in combination, and then this resultant kneaded material is granulated or crushed may be used.

In addition, in the case of molding the molding compound relating to this embodiment, injection molding is appropriately used, but it is not particularly limited thereto, and the molding compound may be molded by another method such as conveyance molding, compression molding, and injection and compression molding. Even though molding conditions at this time depend on the thickness of a molded article, for example, in a case where a molded article having the thickness of approximately 5 mm, the molding may be carried out at a mold temperature of 170 to 190° C., at a molding pressure of 100 to 150 MPa, and for a curing time of 30 to 90 seconds.

EXAMPLES

Raw material components that were used in respective example and respective comparative example are described below.

(1) Alkylbenzene-modified novolac-type phenolic resin: "PR-TS-3"=(xylene resin-22% modified novolac-type phenolic resin), manufactured by SUMITOMO BAKELITE CO., LTD (2) Novolac-type phenolic resin: "A-1077P", manufactured by SUMITOMO BAKELITE CO., LTD (3) Resol-type phenolic resin: "R-25", manufactured by SUMITOMO BAKELITE CO., LTD (4) Hexamethylenetetramine: "HEXAMINE", manufactured by CHANG CHUN PETROCHEMICAL CO., LTD (5) Graphite: "soil graphite #90", manufactured by Nippon Graphite Industries, Ltd.

(6) Glass fiber: "CS3E479S", manufactured by Nitto Boseki Co., Ltd.

(7) Calcium carbonate: "calcium carbonate SS80", manufactured by Nitto Funka Kogyo K.K.

(8) Curing auxiliary agent (magnesium oxide): "STAR MAG M", manufactured by Konoshima Chemical Co., Ltd.

(9) Mold releasing agent: the following two kinds were used in a ratio of 1:1 (weight ratio).

(Polyethylene: "Sun Wax", manufactured by Sanyo Chemical Industries, Ltd.)

(Stearic acid: "stearic acid Sakura", manufactured by NOF corporation)

Examples and Comparative Examples

With respect to Examples 1 to 5, and Comparative Examples 1 to 4, a material mixture, which was obtained by blending respective components according to a blending amount shown in Table 1, was kneaded using heating rolls having a different rotational speed, the resultant kneaded material was cooled in a sheet shape, and the cooled material was crushed to obtain a granular molding compound. In addition, kneading conditions of the heating rolls were as follows: rational speeds of a high-speed side and a low-speed side were set to 20 rpm and 14 rpm, respectively, temperatures of the high-speed side and the low-speed side were set to 90° C. and 20° C., respectively, and a kneading time was set to 5 to 10 minutes.

With respect to a molding compound that was obtained in a blending ratio shown in Table 1, the following measurement and evaluations were carried out.

Evaluation Item (1) Amount of abrasion: a granular molding compound was conveyance-molded (a mold temperature was 175° C. and a curing time was three minutes) to prepare test specimens (a ring and a plate). These test specimens were annealed at 160° C. for 6 hours and then were subjected to an abrasion test by Suzuki-type abrasion test machine under conditions of a pressure of 5 kgf/cm$^2$, a rotational speed of 1.194 m/sec, a test time of 4 hours, and a temperature of room temperature in accordance with JISK 7218. After this abrasion test, a total amount of abrasion of the ring and plate was evaluated. In addition, a unit was set to mm$^3$.

(2) dimensional change ratio: a granular molding compound was injection-molded (a mold temperature was 180° C. and a curing time was 15 seconds) to prepare a rectangular parallelepiped test specimen of 8×4×2 mm. This test specimen was annealed at 160° C. for 6 hours, and then was dipped in warm water at 80° C. for 72 hours. Dimensions in an 8 mm direction before and after the dipping were evaluated. In addition, a unit was set to %.

(3) Bending strength: a granular molding compound was injection-molded (a mold temperature was 175° C. and a curing time was one minute) to prepare a test specimen. This test specimen was annealed at 160° C. for 6 hours, and then the bending strength was measured in accordance with ISO 178. In addition, a unit was set to MPa.

(4) Workability: workability during producing a molding compound was confirmed. Symbols represent the following contents.

◯: Satisfactory

X: Cured while roll kneading was insufficient, and thus blending materials were not uniformly distributed due to insufficient kneading.

Evaluation results relating to the above-described evaluation items are shown in Table 1 together with blending ratios (% by weight) of respective components.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Component (A) | Alkylbenzene-modified novolac-type phenolic resin | 6 | 6 | 8 | 4 | 12 | — | 6 | 6 | 6 |
| | Novolac-type phenolic resin | 16 | 16 | 14 | 18 | 10 | 22 | 16 | 16 | 16 |

TABLE 1-continued

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Component (B) | Resol-type phenolic resin | 7 | 7 | 7 | 7 | 7 | 7 | 7 | 7 | 7 |
| Component (C) | Hexamethylenetetramine | 7 | 7 | 7 | 7 | 7 | 7 | 7 | 7 | 7 |
| Component (D) | Graphite | 40 | 30 | 40 | 40 | 40 | 40 | 41 | 38 | 20 |
| Component (E) | Glass fiber | 12 | 12 | 12 | 12 | 12 | 12 | — | 25 | 12 |
| Others | Calcium carbonate | 10 | 20 | 10 | 10 | 10 | 10 | 21 | — | 30 |
|  | Curing catalyst | 1 | 1 | 1 | 1 | 1 | 1 | 1 | 1 | 1 |
|  | Mold releasing agent | 1 | 1 | 1 | 1 | 1 | 1 | 1 | 1 | 1 |
| Sum |  | 100 | 100 | 100 | 100 | 100 | 100 | 100 | 100 | 100 |
| Amount of abrasion (mm$^3$) |  | 8 | 8 | 10 | 9 | 10 | 5 | 6 | 25 | 20 |
| Water-resistant dimensional change ratio (%) |  | 0.2 | 0.25 | 0.18 | 0.32 | 0.17 | 0.4 | 0.25 | 0.25 | 0.35 |
| Bending strength (MPa) |  | 100 | 80 | 90 | 95 | 60 | 70 | 50 | 120 | 60 |
| Workability |  | ○ | ○ | ○ | ○ | ○ | X | X | ○ | ○ |

As can be seen from Table 1, all of the molding compound of Examples 1 to 5 were superior in an amount of abrasion, water-resistant dimensional change, and bending strength to values of Comparative Examples, and workability was satisfactory. Actually, in a case where sliding parts are manufactured using the molding compound described in examples, sliding parts, which any of the abrasion characteristic, mechanical strength, and water resistance are excellent and these are balanced to a high degree, were obtained.

As is clear from the results obtained from the above-described examples and comparative examples, in the phenolic resin molding compound of the invention, the abrasion characteristic and the strength thereof are balanced to a higher degree and the water resistance is more excellent compared to a phenolic resin molding compound in the related art. Therefore, the phenolic resin molding compound of the invention may be appropriately used as a molded article in which these characteristics are required, for example, a gas meter part (a distribution chamber or a valve), a sliding part such as a vane pump part of a vehicle, and the like.

It is apparent that the present invention is not limited to the above embodiment, and may be modified and changed without departing from the scope and spirit of the invention.

What is claimed is:

1. A phenolic resin molding compound, comprising:
    (A) a novolac-type phenolic resin including an alkylbenzene-modified novolac-type phenolic resin;
    (B) a resol-type phenolic resin;
    (C) hexamethylenetetramine;
    (D) graphite; and
    (E) a fiber-shaped filler,
    wherein in regard to the content of each component on the basis of the entirety of the molding compound, a total content of the components (A) to (C) is 30 to 40% by weight, a content of the component (D) is 30 to 45% by weight, and a content of the component (E) is 10 to 15% by weight, and
    wherein a content of the alkylbenzene-modified novolac-type phenolic resin in the component (A) is 20 to 25% by weight on the basis of a total content of the components (A) and (B).

2. The phenolic resin molding compound according to claim 1, wherein (E) the fiber-shaped filler is glass fiber.

3. The phenolic resin molding compound according to claim 1,
    wherein in a case where a rectangular parallelepiped test specimen of 8×4×2 mm, which is obtained by injection-molding a granular molding compound at a mold temperature of 180° C. and a curing time of 15 seconds, is annealed at 160° C. for six hours and then is dipped in warm water at 80° C. for 72 hours, when a ratio of a dimension in 8 mm direction after being dipped with respect to a dimension in the 8 mm direction before being dipped is set as a dimensional change ratio, the dimensional change ratio is 0.32% or less.

4. A sliding part that is obtained using the phenolic resin molding compound according to claim 1.

* * * * *